A. BRADFORD.
WEIGHING APPARATUS.
APPLICATION FILED APR. 23, 1908.
No. 925,282. Patented June 15, 1909.
4 SHEETS—SHEET 2.
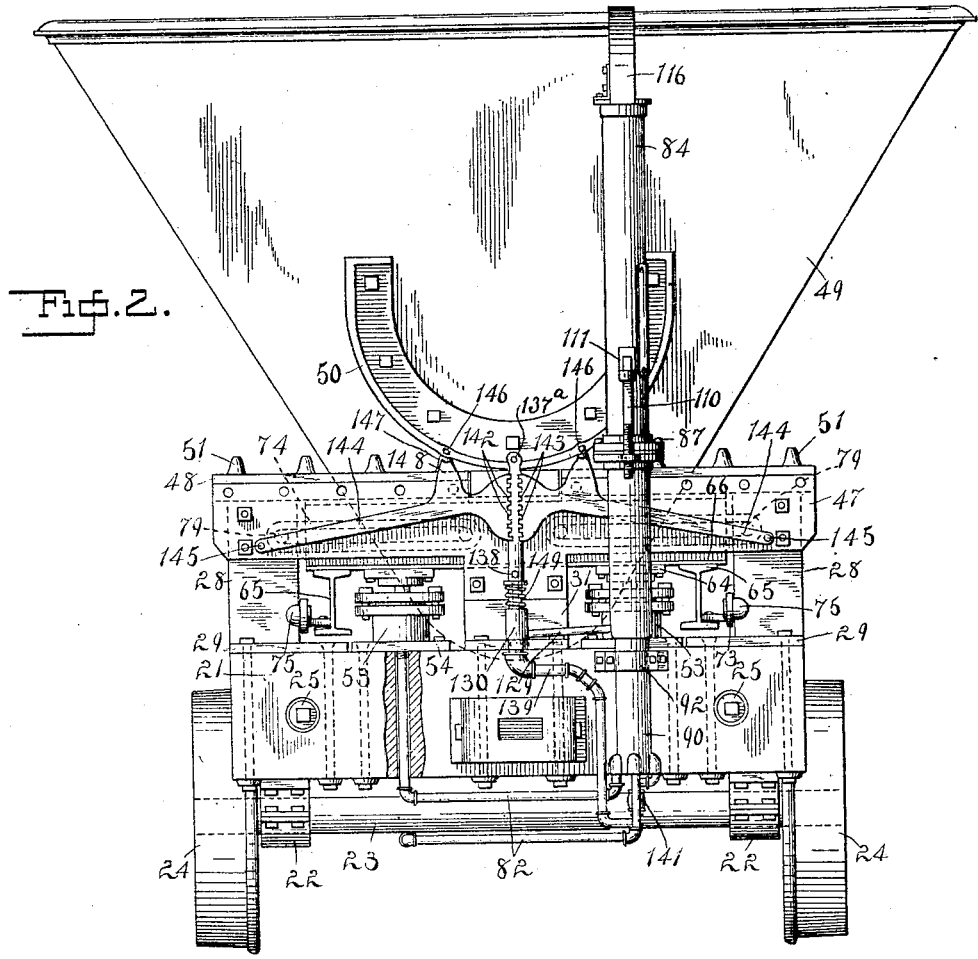
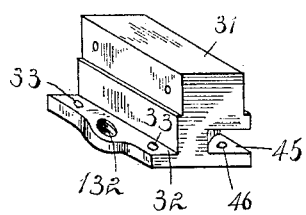
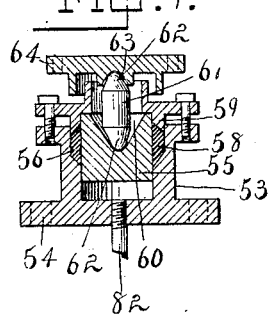
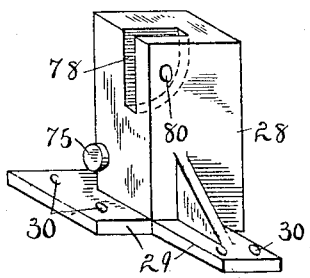
WITNESSES:
Mathew J Marty
C. F. Bassett
INVENTOR
Allen Bradford
By Frederick Benjamin
Atty.

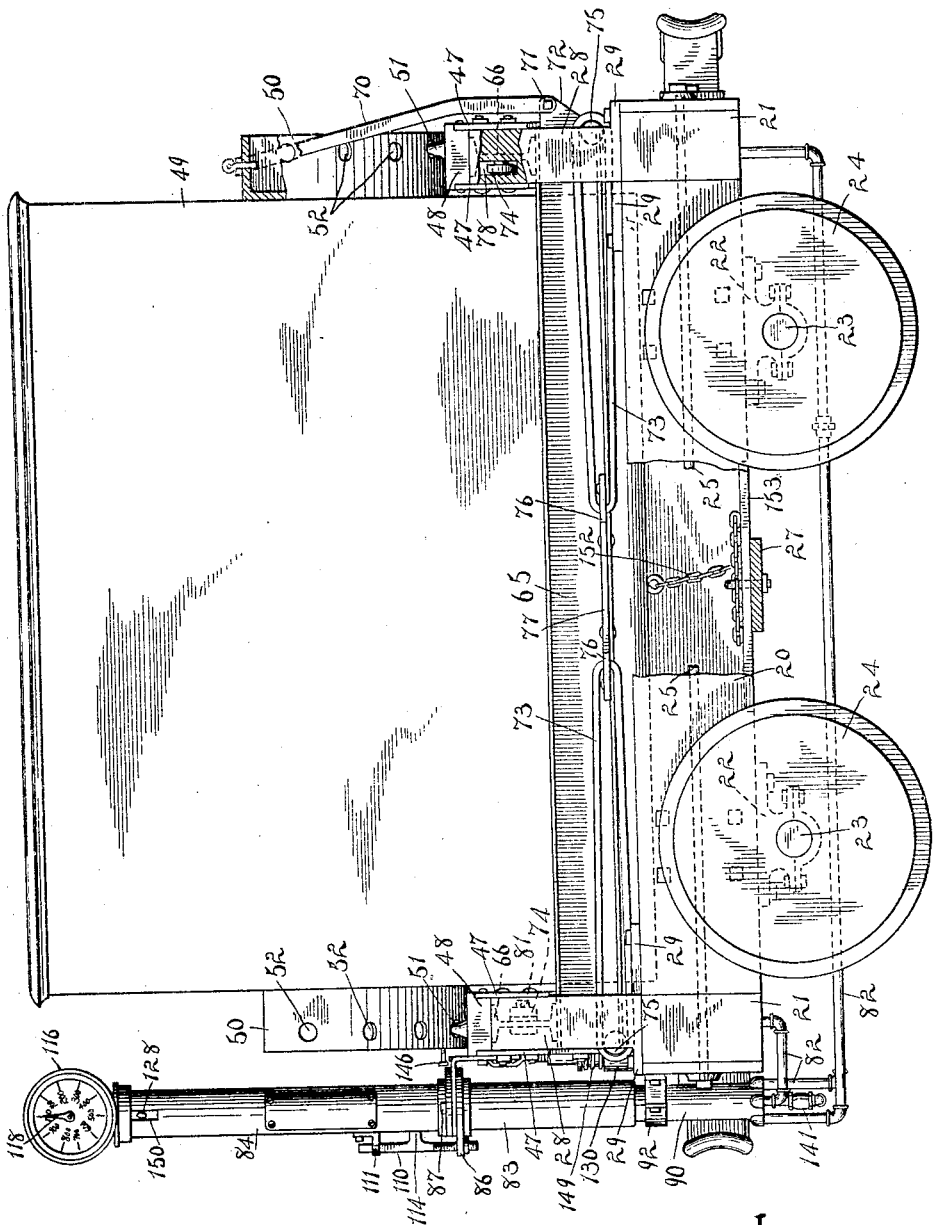

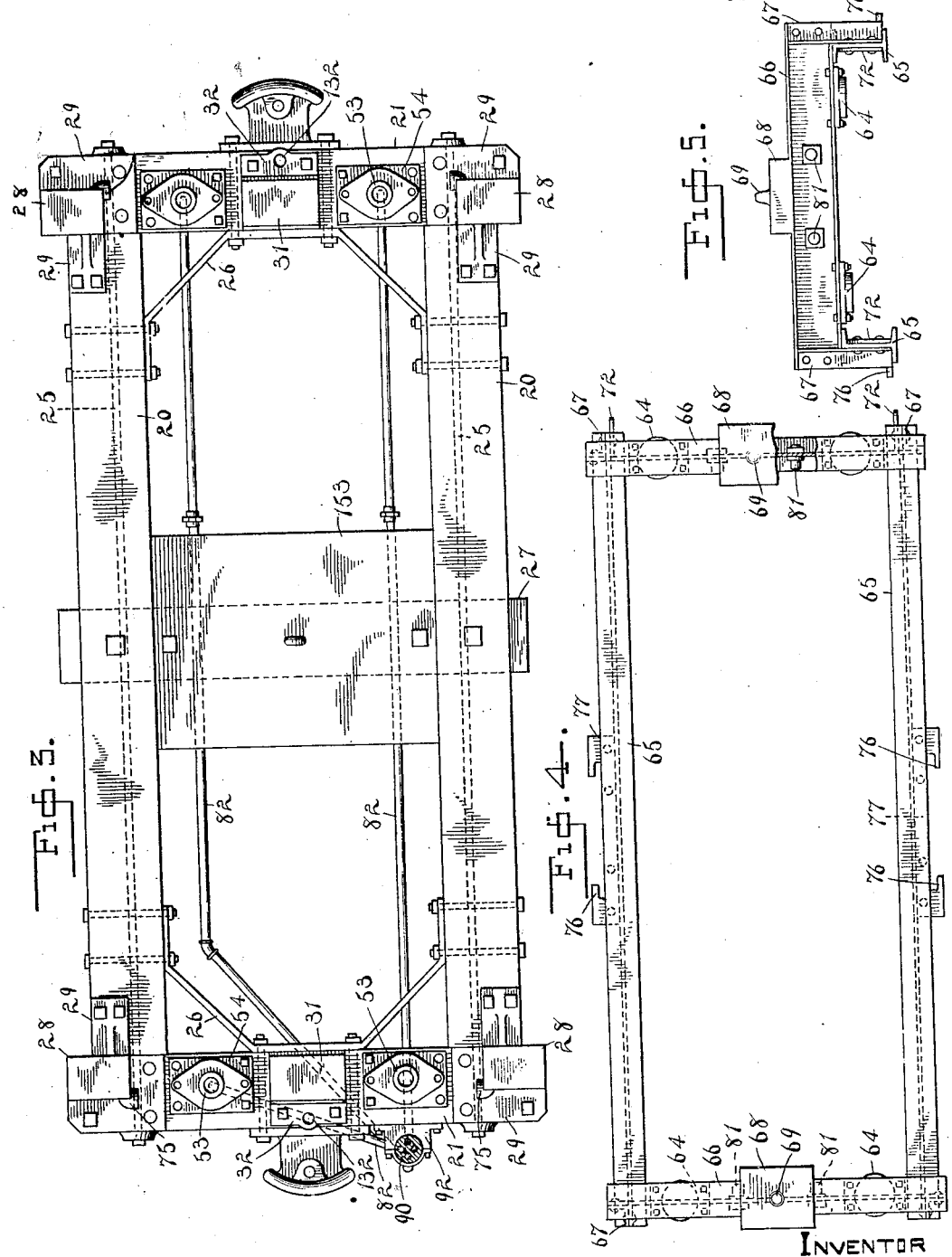

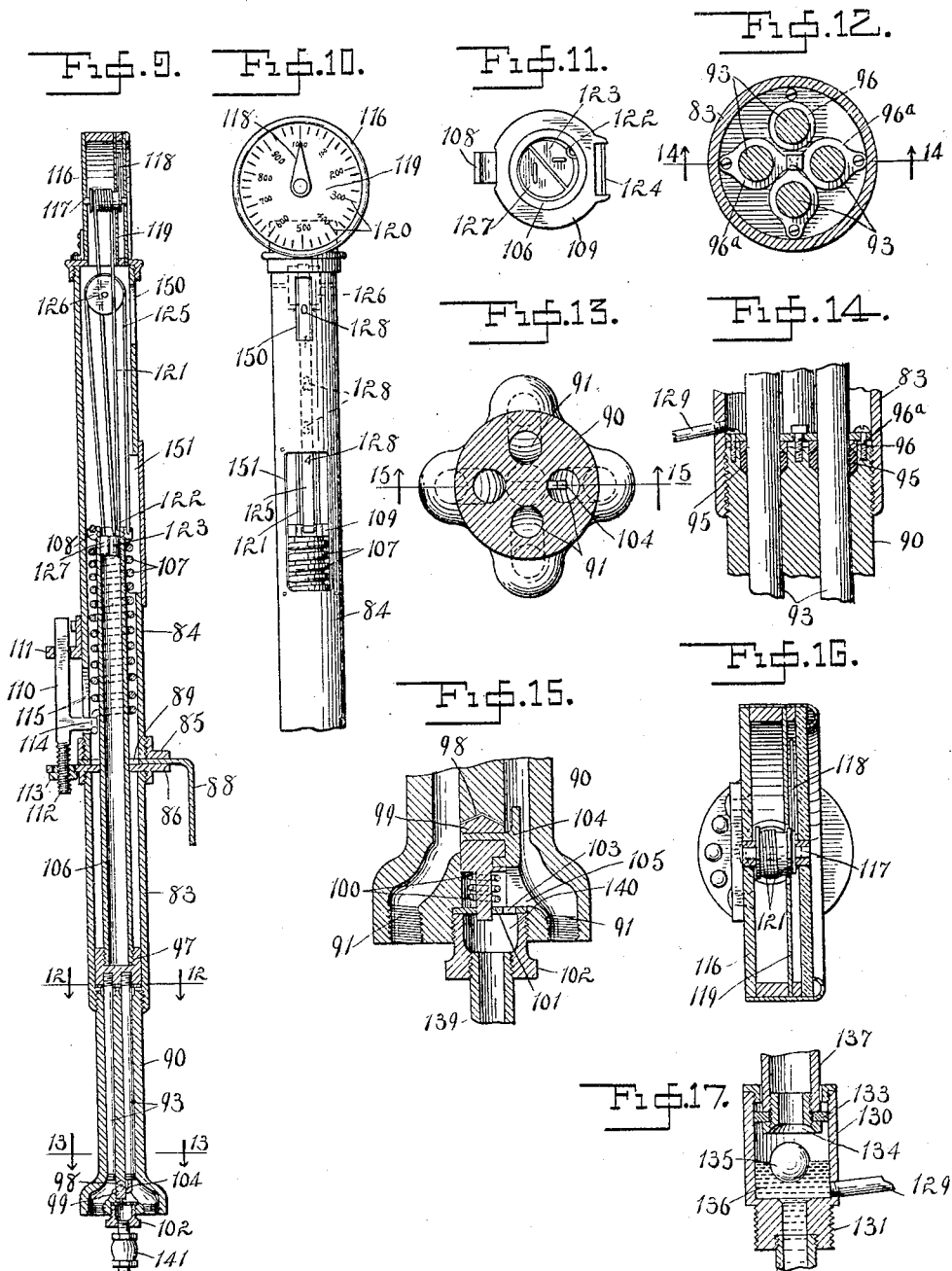

UNITED STATES PATENT OFFICE.

ALLEN BRADFORD, OF KENNET, CALIFORNIA.

WEIGHING APPARATUS.

No. 925,282.

Specification of Letters Patent.

Patented June 15, 1909.

Application filed April 23, 1908. Serial No. 428,709.

*To all whom it may concern:*

Be it known that I, ALLEN BRADFORD, citizen of the United States, residing at Kennet, in the county of Shasta and State of California, have invented certain new and useful Improvements in Weighing Apparatus, of which the following is a specification.

My invention relates to weighing apparatus and has particular reference to appliances designed to be used in connection with dump cars of the type in which the car body is so arranged as to be rocked or rolled to either side in order to discharge the contents. The weighing cars of this class with which I am familiar have heretofore employed more or less complicated arrangements of compound levers, employing fulcrums formed with wedge shaped contacts after the manner of stationary scales. While such sharp-edged supports are adapted to fulfil the requirements in stationary or platform scales, the concussions and jolts to which dumping cars are at all times subject renders weighing apparatus constructed on this principle liable to injury and the expedients which have been introduced to render the devices immobile during the car travel have so far fallen short of the requirements.

It is the purpose of the improvements which form the subject matter of this application to provide a weighing apparatus that will be free from the disadvantages and defects inherent in the mechanical movements heretofore employed; to furnish an appliance for the stated purpose from which all compound and jointed levers will be eliminated and in which there will be no sharp edged bearings, and as a consequence the wear will be so much reduced as to become a negligible quantity, and to produce a device that will be sensitive and accurate in operation.

In the appliance hereinafter described I have discarded the complicated mechanical contrivances of levers, knife-edged bearings, sliding weights and graduated beams, and in their stead have introduced a system depending upon hydraulic principles, thereby producing a simple, durable, and profoundly efficient instrument admirably suited to the purposes of portable weighing apparatus.

In that form of the device illustrated in the accompanying drawings in which is developed the preferred embodiment of my invention, as applied to a dumping car, I have designed a weighing device, which, described in a general way, consists of a system of hydraulic cylinders filled with a suitable fluid and provided with pistons, which support a frame upon which the body of the car rests during the weighing process, and supplied with communicating pipes, subsidiary pistons connected therewith and controlling an indicating device, provision being made for equalizing any unevenness in the distribution of the load and for restoring to the general circulation any loss of the operative fluid from leakage.

I have shown the details of the above described apparatus in the following views:

Figure 1 is a side elevation of a dumping car supplied with my improved hydraulic weighing apparatus; Fig. 2 is an end elevation; Fig. 3 is a top plan view of the supporting framework; Figs. 4 and 5 are a top plan view and an end elevation, respectively, of the floating frame; Fig. 6 is a perspective view of one of the center blocks supporting the rocker track; Fig. 7 is a vertical section of one of the main cylinders and allied structures; Fig. 8 is a perspective view of one of the corner blocks for supporting end of rocker track; Fig. 9 is a vertical longitudinal section of the indicating device; Fig. 10 is a front elevation of the indicator dial and upper portion of the casing, the cover of the manhole being removed; Fig. 11 is a top plan view of the upper end of the guide block stem, the cord and tape being removed from their attachments; Figs. 12 and 13 are sectional views, enlarged, taken on the lines 12—12 and 13—13, respectively, of Fig. 9; Fig. 14 is a sectional view on the line 14—14 of Fig. 12; Fig. 15 is a sectional view on the line 15—15 of Fig. 13; Fig. 16 is a horizontal section, enlarged, taken through the dial case, the cutting plane passing through the spindle axis, and Fig. 17 is a vertical section of the oil pump.

Referring to the details of the drawings, the numeral 20 indicates the side members and 21 the end pieces of a rectangular car frame, supported by journal boxes 22 upon axles 23, having flanged track wheels 24 at their outer ends. The said members of the car frame are securely joined together by bolts, the structure being rendered especially rigid by the introduction of longitudinal tie bolts 25 extending entirely through the frame from end to end. As an additional strengthening feature internal corner braces 26 are introduced at each end and a cross tie 27, completes what may be properly termed the truck, or foundation frame. Upon each corner of the foundation frame is securely bolted a rectangular block having a vertical body 28, provided with horizontal flanges 29, having holes 30 for the securing bolts. Upon each of the end pieces 21 of the said truck frame, in the median line of the structure rests a rectangular center block 31, having a foot plate or flange 32 projecting at the outer side, in which are bolt holes 33. The inner corners of the blocks 31 are formed with recesses or notches 45, to facilitate the introduction of the securing bolts, holes 46 being provided in the lower walls of the recesses for said bolts. The said corner blocks 28 are connected at each end of the frame by hollow girders formed of side plates 47, bolted along their upper margins to the edges of track-plates 48, the latter being separated by an interval at the median line. These girders are firmly bolted to the center blocks 31 as well as to the corner blocks 28 and form rigid structures for supporting the car body 49 which I prefer to construct in the usual form prevalent in dumping cars, with sloping sides and rounded bottom, as shown in full and dotted lines in the end elevation, Fig. 2. At each end of the body is bolted a semicircular flange or rocker 50, which rests upon the track plates 48 whenever the body 49 is tilted in either direction. In order to keep the said rocker and track in proper alinement the track-plates are provided with spaced conical bosses or teeth 51, which engage corresponding holes 52 formed in the tread of the rockers whenever the latter are rolled thereupon.

About midway between the center blocks 31 and the corner blocks, upon each end piece 21 of the truck frame are located hydraulic cylinders 53. There are thus four of these cylinders, each having a base plate 54 (Fig. 7) by means of which the device is firmly bolted to the end piece 21 of the truck frame. Each cylinder is provided with a piston or plunger 55, in the form of a cylindrical block, and is furnished with a stuffing box 56, the packing material 58 being secured by a gland 59. The upper end of the plunger 55 is furnished with a conical recess 60 to receive the lower end of a fulcrum post 61. The ends 62 of the posts are made conical and the upper end of each post is received in a conical depression 63 in the under surface of a fulcrum plate 64, secured to the under side of a rectangular floating frame constituted as follows: The side members 65 are formed of suitable I-beams and upon these rest the extremities of the end members 66, also made of I-beams and the members thus assembled at different levels are firmly bolted together by means of angle irons 67, placed vertically at the corners of the frame, the flanges of the I-beams being cut away where necessary to accommodate them. The end beams 66 carry at their middle points fixed rectangular center plates 68, from the center of which rises a lug or tooth 69, similar to the teeth 51. The floating frame rests upon and is supported entirely upon the fulcrum posts 61 the fulcrum plates 64 being so located that their centers correspond with the vertical axes of the cylinders 53, and when so assembled the end members 66 are loosely housed within the hollow girders, between the plates 47, the plates 68 occupying the interval between the inner ends of the track-plates 48, thus filling the gap and forming a complete track from one side of the car to the other.

When the car body 49 is in its vertical position, as shown in Fig. 2, it is seen to rest entirely upon the center plates 68, and as these plates are carried upon the floating frame, the said body and its contents will be supported entirely by the cylindrical plungers 55, through the medium of the structures just described, and the said body is retained in its vertical position by means of a bail 70, pivoted at 71 to ears 72 attached to the floating frame at one end of the car, and adapted to be passed over the rocker 50. The floating frame when elevated upon the four fulcrum posts 61 is held from lateral deviation in either direction by elongated loops or links 73, 74, which are located upon the sides and ends, respectively, of the said frame. The links 73 pass around circular bearings or bosses 75 attached to the corner blocks 28 and thence extend in a horizontal direction parallel with the side members 65 of the floating frame to a point near the median transverse line of the car, where they engage hooks 76, formed in the ends of anchor plates 77, bolted or riveted to the flange of the I-beam 65. The links or loops 74, located upon the ends of the frame are lodged at their outer extremities in notches 78 formed in the corner blocks 28, and held in place by pins or lugs 79 which enter holes 80 in the said blocks. The inner ends of the said links are looped over lugs 81 which pass through the web of the I-beams 66, near the median line of the frame. As the links thus described are not fixed to their lugs or hooks, the vertical movements of the said floating frame are not in the least hampered, the total movement of the frame being so slight that the friction of the loop bearings will be inappreciable.

Each of the four hydraulic cylinders 53 is separately connected by a pipe 82 with an indicating device, the construction being as follows:—A tubular casing, composed of two sections 83, 84, connected by a union, is arranged vertically at one end of the car frame. The junction is formed by flanged collars 85, 86, each having a threaded connection with its respective section, and held firmly together by bolts 87 passing through the flanges of the collars. Between said collars is clamped the horizontal arm of a bracket 88 bolted to the car frame, and serving as a support for the indicator casing, the said arm having an opening 89 corresponding with the bore of the casing, thus avoiding any obstruction in the passage from one section to the other. The lower end of the casing section 83 has a threaded connection with the upper end of a cylinder 90, provided with four longitudinal bores 91, extending entirely through the member. The said cylinder is supported in a clamping ring 92 bolted to the car frame, and at its lower end the cylinder body is expanded to admit of the attachment of the pipes leading from the hydraulic cylinders 53, each of said cylinders thus having a distinct and separate communication with one of the bores 91 of the compound cylinder 90. Within these bores are located pistons 93, closely fitting the cylinder bores and projecting through stuffing boxes 95 (Fig. 14) the packing being guarded by glands 96, thus permitting the boxes to be packed separately. All four of the pistons 93 have threaded connection with a guide block 97 slidably arranged in the bore of the casing so that they move in unison. This simultaneous movement of the pistons insures an even depression of all the main plungers whenever the load is increased, although the weight of the load may be greater at one end of the car body than the other. Water may be used in the hydraulic system thus described for transmitting the motion of the larger to the smaller pistons, but for various reasons oil or an analogous liquid is to be preferred, particularly because of its non-freezing character. In case there should be a leakage of oil at one or more of the pistons 93, the movements of the corresponding plungers 55 would be affected, and they would stand at different levels. It is necessary to correct this liability of the plungers to become uneven, and is accomplished by means of an automatic device as follows:—The central division wall separating the bores 91 is removed near the lower end of the cylinder, forming a common passage or port 98 (Fig. 15) communicating with all the said bores. This port is normally closed by a valve 99 held against its seat by a spring 100. The lower end of the cylinder 90 is counterbored to receive a plate 101, held in place by a threaded pipe junction 102. The plate 101 has a central aperture to guide the stem of the valve 99 and a decentered opening 103. The valve 99 is furnished with an operating finger 104 which projects into the path of one of the pistons 93, and when the latter descends it will engage the finger and depress the valve 99 to open the port 98, a slot 105 permitting the finger to move sufficiently, and the oil will pass freely through said port to restore the equilibrium. The said guide block 97 is provided with a hollow stem or tube 106 having a threaded connection therewith and extending upward through the casing section 83, and into the section 84 to a suitable height. The upper portion of this stem is surrounded with a coiled tension spring 107, its upper end being attached to a hook 108 formed integral with a collar 109 fixed to the extremity of the tube 106. An anchor-bar 110 for the spring is arranged vertically upon the outside of the casing 84, its smooth upper end slidably supported in a bracket 111 attached to said casing and its lower end 112 threaded and passing through the flange 85, where it is held against upward movement by a nut 113. An arm 114 projects laterally through a vertical slot 115 in the casing and is engaged by the lower end of the spring 107.

Upon the upper end of the tubular casing 84 is mounted a circular case 116 in which is journaled a spindle 117 carrying an index or pointer 118 which travels over a face or dial 119 supplied with graduations 120 numbered from 0 to 1000. A cord 121 attached by one end to the pipe 106 at 122, is wound a few turns about the said spindle and then brought down to the starting point and fastened to a weight 123, hung within the cavity of the said tube. Upon the side of said collar opposite to the hook 108 is fixed a light rod 124 to afford a fastening for one end of a tape 125, which is then carried upward and over a drum 126 journaled near the top of the casing, the end being brought down to be attached to a weight 127 similar to the one for the cord 121. Upon the outer face of the tape 125 are affixed numerals 128 ranging from 0 to 4 or more, according to the capacity of the apparatus. As the pistons 93 move upward with each increase of the load in the car body, the weights 123 and 127 will move downward together, maintaining proper tension upon both cord and tape, and compensating for any variations in length due to unequal stretching.

Any oil which may leak past the pistons 93 and accumulate above the cylinder 90 is restored to the general system by means of an automatic pump which will now be described. The cavity of the casing 83 is tapped by a drainage pipe 129 through which the oil may pass by gravity to a pump cylinder 130, constructed with a threaded base 131, which is adapted to be received in a threaded aperture 132 formed in the foot flange of the center block 31 at the indicator end of the car. The said cylinder is provided with a hollow piston 133 open at both ends and flaring below to furnish a conical valve seat 134, for a ball valve 135, made of cork or other suitable material lighter than the liquid 136 used in the system, and upon which the valve is represented as floating (Fig. 17). A piston rod 137 attached to the piston 133 is hollow throughout its lower portion and at some point is furnished with a vent 138 which permits the free exit of the confined air during the descent of the rod and piston, no movement of the oil 136 taking place until the latter has accumulated in sufficient quantity to raise the floating valve high enough to meet the piston as it descends and close the opening therein. Any further movement of the piston will then drive the accumulated oil through a pipe 139, which leads from the cylinder 130 to the chamber 140 in the lower end of the cylinder 90, a check valve 141 preventing any back flow of oil. The oil when forced beyond the check valve will pass through the opening 103 and the slot 105 into that bore with which said slot connects, being equally distributed by the opening of the valve 99 when the pistons 93 next descend. The drainage pump thus described is operated automatically whenever the car body is rolled in either direction the mechanism by which this is accomplished being arranged as follows:—The piston rod 137 is extended upward and provided with rack teeth 142 upon either side which are engaged by segment gears 143 attached to levers 144 pivoted to the hollow girder at 145. Into the outer margin of the rocker 50 above the pump are inserted removable pins 146 which alternately engage notches 147 in projections 148 attached to the said levers, whenever the car body is rolled laterally to dump its load, thus depressing the piston, and when the weight of the car body is again removed, a coiled spring 149 restores the piston to its normal position.

The functions of the various pieces of mechanism having been set forth in connection with the details of construction, a brief description of the operation of the appliance at this point will be sufficient to give a clear understanding of the scope of the invention. When the parts are assembled as shown in the drawings, the cylinders 53 and their connecting pipes filled with oil, and the car body resting in an upright position upon the center plates 68, the entire weight of the floating frame and car body will be upon the plungers 55 and the oil in the system will transmit the pressure to the pistons 93. The strength of the tension spring 107 is so proportioned that when the conditions are as above presented the pistons 93 will be pressed downward to their lowest position, shown in Fig. 9, the port 98 will be open and the hydraulic pressure evenly distributed throughout the system. The index 118 and tape 125 will both stand at 0, the characters upon the tape being read through a sight opening 150 in the casing, the latter being provided with a larger aperture or hand hole 151, for convenience in adjusting the cord and tape at their attachments. The main pistons or plungers which support the car body and load have a combined area considerably larger than that of the pistons which move the indexes, so that the movement of the guide block 97 is proportionally magnified and by this means almost imperceptible movements of the larger pistons will be easily read upon the circular graduations, making it practicable to construct a scale reading to 10 lbs. or less. The proportions are such that a weight of 1000 lbs. in the car body will cause precisely one revolution of the index, and the spacing of the numerals upon the tape permits each successive figure to arrive at the indicating point as the revolving index reaches 0.

Supposing that it is required to estimate and convey a given charge to a smelting furnace, the car is moved under the discharge gate of an ore bin, and a specified number of pounds of ore taken into the car, the amount being determined by the readings upon the indicator. The car is then rolled to another bin containing a different grade or quality of ore, or fluxing rock and the required amount taken aboard the car. In this way the car is moved along until a load or charge is made up of such mixtures and amounts of ore and rock as may be required. The car is then transported to the place of discharge, the bale 70 turned to release the rocker and the body rolled off from the floating frame which will immediately rise until the end pieces 66 impinge against the top of the hollow girders, the impelling force being the action of the spring 107 which drives the pistons 93 down to their initial position restoring the indicating devices to their starting points, and opening the port 98, while the pump 130 will automatically restore to the system any oil which may have leaked past the smaller pistons 93. The car body is restrained from being carried too far upon the truck 48 by means of an anchoring chain 152 secured to the bottom of the body and resting when slack upon a plate 153. As soon as the load is dumped and the body returns to its upright position, the floating frame will be depressed, and with the indexes again at 0 the car is ready for another load. The pump 130 may be operated independently of the car body movement to force oil into the system of pipes and cylinders, the stem 137 being furnished with an eye 137ª for the attachment of a suitable lever or other operative mechanism.

Having thus described my invention what I claim as new, is:

1. In a weighing apparatus, the combination with a frame and a receptacle, of hydraulic cylinders, plungers in the cylinders adapted to support the receptacle, and means for indicating variations in the position of the receptacle relative to a fixed horizontal plane said means comprising an indicator, a series of pistons operatively connected with said indicator, and means for equalizing the pressure on the pistons.

2. In a weighing apparatus, the combination with a frame, hydraulic cylinders, and plungers in the cylinders, of a second cylinder having a plurality of bores, pistons in said cylinders rigidly connected, an indicator, operative connection between the indicator and said pistons, and means for equalizing the pressure in the bores.

3. In a weighing apparatus, the combination with a frame, a plurality of cylinders, plungers in the cylinders and a floating frame supported on the plungers, of an indicator, a cylinder having a plurality of bores, connections between each of said bores and one of said cylinders, means for temporarily connecting all of said bores together, and operative connection between the pistons and said indicator.

4. In a weighing apparatus, the combination with a frame, of a plurality of main cylinders, plungers in the cylinders, a receptacle supported upon the plungers, an indicator, an indicator-cylinder and pipes connecting each main cylinder with the indicator cylinder and means for equalizing the pressure in said pipes.

5. In a weighing machine, the combination with a frame, of a plurality of main cylinders, plungers in the cylinders, a receptacle supported upon the plungers, an indicator-cylinder having a plurality of bores, pistons in said bores, pipes connecting each of said bores with one of the main cylinders, a common passage between the said bores, and a valve for said passage.

6. In a weighing machine, the combination with a frame, of a plurality of main cylinders, plungers in the cylinders, a receptacle supported upon the plungers, an indicator cylinder having a plurality of bores, pistons in said bores, a rigid connection between the pistons, a spring for the pistons, a common passage between the said bores, a valve for said passage, a pipe connecting each of said bores independently with one of the main cylinders, and an indicator.

7. In a weighing machine, the combination with a frame, of a plurality of main cylinders, plungers in the cylinders, a receptacle supported upon the plungers, an indicator-cylinder provided with a plurality of bores, pistons in the bores, a rigid connection between the pistons, a spring for the pistons, a common passage between the bores, a valve for said passage, a plurality of pipes each connecting one of said bores independently with one of the main cylinders, an indicator, and means for forcing liquid into one of said pipes.

8. In a weighing machine, the combination with a frame and a receptacle, of an hydraulic system for counterbalancing said receptacle, said system consisting of a plurality of main cylinders, plungers in the cylinder, an indicator cylinder provided with a plurality of bores, pistons in the bores, a rigid connection between the pistons, a spring for the pistons, a common passage between the bores, a valve for said passage, a pipe independently connecting each bore with one of the main cylinders, an indicator, and means for restoring to the system any liquid which may leak past the said indicator-cylinder.

9. In a combined weighing and dumping apparatus, the combination with a frame, track wheels for the frame, and a rockable receptacle, of a series of hydraulic cylinders, plungers in the cylinders, a floating frame supported on the plungers, an indicator-cylinder having a plurality of bores, pistons in the bores, a pipe connecting each bore independently with one of the hydraulic cylinders, an indicator, and a pump arranged to force liquid into one of said pipes.

10. In a combined weighing and dumping apparatus, the combination with a frame, supporting wheels for the frame, and a rockable receptacle, of a series of hydraulic cylinders, plungers in said cylinders, a floating frame carried upon said plungers, an indicator cylinder having a plurality of bores, a common passage connecting the bores, a valve for the passage, pistons in the bores, an independent connection between each of said bores and one of said hydraulic cylinders, and means for restoring any leakage of liquid to the cylinders.

11. In a combined weighing and dumping apparatus, the combination with a frame, track wheels supporting the frame, and a rockable receptacle, of hydraulic cylinders, plungers in the cylinders, a floating frame borne on the plungers, an indicator-cylinder having a plurality of bores, a common passage between said bores, a valve for the passage, pistons in the bores, a rigid connection between the pistons, a spring arranged to counterbalance the floating frame and a load placed thereon, an independent connection between each of said bores and one of said hydraulic cylinders, and a pump for forcing liquid into one of said independent connections.

In testimony whereof I affix my signature in the presence of two witnesses.

ALLEN BRADFORD.

Witnesses:
JAMES L. MONTGOMERY,
R. WAYNE MOSS.